United States Patent
Godiot et al.

(10) Patent No.: US 9,488,216 B2
(45) Date of Patent: Nov. 8, 2016

(54) BALL-JOINT MECHANISM BETWEEN A CLEVIS AND A CONNECTING ROD, IN PARTICULAR FOR CONTROL APPARATUS OF A ROTORCRAFT

(71) Applicant: AIRBUS HELICOPTERS, Marignane (FR)

(72) Inventors: Patrice Godiot, Velaux (FR); Claude Bocoviz, Allauch (FR); Ludovic Somson, La Roque d'Antheron (FR)

(73) Assignee: Airbus Helicopters, Marignane (FR)

( * ) Notice: Subject to any disclaimer, the term of this patent is extended or adjusted under 35 U.S.C. 154(b) by 1044 days.

(21) Appl. No.: 13/664,960

(22) Filed: Oct. 31, 2012

(65) Prior Publication Data
US 2013/0114995 A1    May 9, 2013

(30) Foreign Application Priority Data

Nov. 7, 2011 (FR) .................................. 11 03375

(51) Int. Cl.
| | | |
|---|---|---|
| F16B 7/06 | (2006.01) |
| F16B 7/10 | (2006.01) |
| F16C 11/00 | (2006.01) |
| F16G 11/12 | (2006.01) |
| F16C 11/06 | (2006.01) |

(52) U.S. Cl.
CPC .... F16C 11/0614 (2013.01); *Y10T 403/32057* (2015.01)

(58) Field of Classification Search
USPC ............. 403/23, 58–63, 67–72, 76, 79, 114, 403/115, 157, 158, 159, 161–167; 244/17.23, 17.11, 66, 131; 248/554
See application file for complete search history.

(56) References Cited

U.S. PATENT DOCUMENTS

| | | | | |
|---|---|---|---|---|
| 4,139,245 A | * | 2/1979 | McCloskey | 384/203 |
| 4,243,192 A | * | 1/1981 | Johnson | 244/215 |
| 5,058,829 A | * | 10/1991 | Bentley | 244/122 R |
| 5,123,188 A | * | 6/1992 | Loda | 40/1.5 |
| 5,860,623 A | * | 1/1999 | Dunstan et al. | 244/54 |
| 6,296,203 B1 | * | 10/2001 | Manteiga et al. | 244/54 |
| 6,330,995 B1 | * | 12/2001 | Mangeiga et al. | 248/554 |
| 6,371,681 B1 | | 4/2002 | Covington | |

(Continued)

FOREIGN PATENT DOCUMENTS

| | | |
|---|---|---|
| FR | 2798641 A1 | 3/2001 |
| FR | 2951511 A1 | 4/2011 |

OTHER PUBLICATIONS

Search Report and Written Opinion; Application No. FR 1103375; dated Jun. 26, 2012.

*Primary Examiner* — Gregory Binda
*Assistant Examiner* — Nahid Amiri
(74) *Attorney, Agent, or Firm* — Brooks Kushman P.C.

(57) ABSTRACT

A ball joint mechanism between a connecting rod (1) and at least one journal (3, 3') is provided. A lateral protection part (12, 12') interposed between the connecting rod (1) and the journal (3, 3') is arranged as a one-piece ring comprising a wear member (14, 14') and a fastener member (15, 15') that are secured to each other. The fastener member (15, 15') is made of hard material and is interposed with axial clamping between the journal (3, 3') and a shoulder (20, 20') of an assembly pin (7) between the connecting rod (1) and the journal (3, 3') via opposite end faces thereof with a space being arranged between them to receive the wear member (14, 14').

20 Claims, 1 Drawing Sheet

(56) References Cited

U.S. PATENT DOCUMENTS

| | | | |
|---|---|---|---|
| 6,669,393 B2 * | 12/2003 | Schilling | 403/2 |
| 7,445,399 B2 * | 11/2008 | Dunn et al. | 403/150 |
| 7,566,029 B2 * | 7/2009 | Dron et al. | 244/54 |
| 7,753,612 B2 * | 7/2010 | Bouru et al. | 403/158 |
| 8,002,489 B2 * | 8/2011 | Mahy et al. | 403/158 |
| 8,083,177 B2 * | 12/2011 | Renon et al. | 244/54 |

* cited by examiner

BALL-JOINT MECHANISM BETWEEN A CLEVIS AND A CONNECTING ROD, IN PARTICULAR FOR CONTROL APPARATUS OF A ROTORCRAFT

CROSS REFERENCE TO RELATED APPLICATIONS

The present application claims priority to French patent application FR 11 03375 filed on Nov. 7, 2011, the disclosure of which is incorporated in its entirety herein.

BACKGROUND OF THE INVENTION (1) Field of the Invention

The present invention relates to the field of rotorcraft, and more particularly to the field of ball joint assembly mechanisms between a connecting rod and at least one journal, in particular of a clevis.

(2) Description of Related Art

One specific application for such a ball-joint mechanism lies in it being incorporated in control apparatus of rotorcraft arranged to allow the pilot to transmit flight commands and/or operating commands to at least one rotor of the rotorcraft.

The present invention provides such a ball-joint mechanism that incorporates at least one lateral protection part that is interposed axially between the connecting rod and the journal. The protection part is more particularly of the type arranged as a one-piece ring or one-piece member of analogous shape for providing axial protection to the facing side faces of the connecting rod and of the journal.

In the field of rotorcraft, control apparatuses are commonly used to enable the pilot to transmit flight commands and/or operating commands for a rotor of the rotorcraft. Such control apparatuses comprise hinge mechanisms, and more particularly ball-joint mechanisms between at least one journal and a connecting rod. A ball-joint connection between the connecting rod and the journal allows them to move relative to each other both in pivoting and with lateral clearance.

The ball joint is made up of portions in relief having co-operating spherical bearing surfaces, comprising a ball arranged as a male member that co-operates with a cage of complementary shape. The cage and the ball are arranged respectively on the journal and on the connecting rod, or vice versa, the journal engaging at least axially against an assembly pin that carries one of the portions in relief having a spherical bearing surface. The journal may be a single journal or may form a component part of a two journal clevis with the connecting rod placed between the journals.

The assembly pin is commonly arranged as a bolt or an analogous axial assembly member that passes through a bore in the journal and that is blocked axially in position on the journal by axial clamping. In order to protect the bore of the journal through which the assembly pin extends, it is common practice to interpose a shouldered bushing radially between them. The axial blocking between the journal and the assembly pin may be obtained via the shouldered bushing. The shoulder included in the assembly pin is advantageously formed by the spherical bearing surface in relief that is carried thereby.

A general problem that arises lies in surface damage caused by the relative sideways movements between the connecting rod and the journal. The facing flanks of the connecting rod and of the journal are in danger of striking against one another when the connecting rod moves sideways with the consequence of damaging their corresponding side surfaces, or "flanks", in use.

In order to solve that problem, it is common practice to interpose a lateral protection part axially between the connecting rod and the journal in order to preserve their facing flanks Such protection parts comprise wear masses made of soft material, a polymer material or some other analogous material. The wear mass serves to avoid damaging the more expensive materials from which the journal and the connecting rod are made. The protection part is designed to be replaced after it has been worn by more than an acceptable threshold.

Difficulties that need to be overcome lie in obtaining accurate and reliable assembly of the protection part when it is assembled on the ball-joint mechanism. Such assembly must also enable the protection part to be replaced quickly and easily when required.

The ball-joint mechanism must be structurally simple in order to avoid increasing the cost of making it, but without that harming its reliability or its length of life. The way the various members and parts making up the ball-joint mechanism are assembled together needs to be simple in order to reduce maintenance costs, in particular when replacing the protection part.

A traditional solution consists in securing the protection part constituted by said wear mass against the corresponding flanks of the journal and/or of the connecting rod by adhesive bonding. Such a solution presents the advantage of giving the protection part a structure that is simple and making it easier for the protection part to be assembled accurately and lastingly.

Nevertheless, arranging the ball-joint mechanism in that way makes replacement of the protection part once it has worn more complex, since such replacement involves a difficult operation of breaking the adhesive bond.

Another well-known solution consists in mounting the protection part so that it is floating on the assembly pin, being interposed axially between the corresponding flanks of the connecting rod and of the journal. Such a solution makes it easier to remove the protection part in order to replace it.

Nevertheless, that solution affects the accuracy with which the protection part is positioned on the mechanism because the part is free to move on the assembly pin. Such freedom of the protection part to move increases as it becomes more worn. The inaccuracy with which the protection part is assembled affects the reliability and the lifetime of the mechanism and can give rise to tensions on the parts making up the mechanism.

Proposals are made in document FR 2 951 511 (Eurocopter France) for a ball-joint mechanism between a clevis and a connecting rod that includes a lateral protection part incorporating a fastener member and a wear member. The fastener member and the wear member are secured to each other in a workshop by adhesive bonding. The fastener member is a deformable member used for fastening the wear member on the journal by elastic interfitting. Elastic deformation of the fastener member makes it possible to engage the protection part firmly against the journal. The wear member is secured to the fastener member in a workshop and the resulting protection part is then installed when assembling the ball-joint mechanism, the protection part being placed axially between the facing flanks of the journal and of the connecting rod.

Organizing the assembly of the protection part on the ball-joint mechanism in that way is advantageous in terms of the way it is fastened to the journal via the fastener member. The resulting fastening ensures accurate positioning and firm retention of the wear member in position on the mechanism, with this being independent of its degree of wear. Once worn, the protection part can be replaced easily and quickly by a technician, by elastically deforming the fastener member so as to withdraw one protection part and conversely install another one on the journal.

In practice, it has been found that such arrangements need to be improved in terms of simplifying the structure of the protection part and reducing the costs of obtaining it.

Nevertheless, any such improvement should obtain the looked-for advantages in terms of the difficulties and problems mentioned above. In particular, care must be taken to ensure that any improvements made still lead to accurate and reliable positioning of the protection part of the mechanism, both axially and radially. Care should also be taken that progressive wear of the protection part does not interfere with it being kept in position on the ball-joint mechanism.

Account should also be taken of the fact that maintenance on the ball-joint mechanism might lead to replacement of at least one of the spherical bearing surface members or indeed of the entire ball joint that connects together the two co-operating members having spherical bearing surfaces.

It is advantageous for a replacement of a ball-joint structure to be used to replace an existing ball-joint structure with a new ball joint that presents better performance and that is of a different structure. Such a difference in ball-joint structure relates in particular to its dimensions and/or to the materials from which one and/or more of the spherical bearing surface members are made. It is desirable for such a substitution to be easy to perform while limiting any effects on operations and on the advantages provided by the protection part.

Another difficulty needs to be taken into account with respect to managing stocks of the protection part itself and/or of the various parts that make it up. With the protection part being selected as a single piece comprising a fastener member and a wear member secured to each other, it is advantageous for the structure of the protection part to make it easier to manage the stocks of parts needed for producing it and that make it up.

The component parts of the protection part comprise in particular the fastener member and the wear member, and prior to them being secured to each other separate stocks of those parts need to be managed. The members constituting the protection part may be of various dimensions and possibly of various configurations depending on the protection part that is to be obtained for matching a particular ball-joint mechanism in which it is to be installed.

Such management of stocks of individual parts making up the protection part must be made easier, while also making it easy to adapt the protection part to almost any arbitrary ball-joint mechanism for a given general organization of the mechanism. The concept of any "arbitrary mechanism" should be considered with respect to the co-operating parts that make up the mechanism and that serve in particular to provide said ball joint.

The co-operating parts that make up the ball joint of the mechanism comprise in particular the journal, the connecting rod or at least any other spherical bearing surface in relief with which it is provided, and/or the assembly pin or at least the spherical bearing surface in relief associated therewith.

The management of stocks of the protection part itself must take account of the looked-for suitability of the protection part with respect to replacing the ball joint with a new ball joint of different structure.

BRIEF SUMMARY OF THE INVENTION

The object of the present invention is to provide a ball-joint mechanism between a journal and a connecting rod forming part of a control apparatus, in particular for a rotorcraft, the mechanism being of the type suitable for allowing the journal and the connecting rod to move relative to each other both in pivoting and with lateral clearance.

Such a ball-joint mechanism is of the type in which the protection part prevents the parts that are to be protected from coming into direct lateral contact with each other, the connecting rod and the journal in particular, under the effect of the connecting rod rocking sideways as induced by its ball-joint connection with the journal.

The protection part included in the mechanism is more particularly of the type that is arranged as a one-piece ring, being structured as a wear member that is secured to a fastener member for holding the protection part in position axially between the parts that are to be protected.

It is more specifically sought in the present invention to propose such a ball-joint mechanism of organization that makes it possible to overcome as well as possible the problems and the difficulties that are mentioned above.

The protection part included in the mechanism is also sought to have a structure that makes it easier to benefit from the above-mentioned opportunities, in particular with respect to replacing its ball joint with a new ball joint of different structure.

The lateral protection part included in the mechanism of the present invention is selected to be arranged as a one-piece ring, or as a member of analogous annular shape.

Such a one-piece ring has a peripheral face that is particularly but not necessarily a surface of revolution, and that extends axially between two axial end faces. The ring also has an axial hole providing a passage for the assembly pin between the connection rod and the journal. The axial hole in the ring is particularly, but not necessarily, of cylindrical shape, allowing the assembly pin to pass along its axis through the protection part.

The one-piece ring comprises at least two members made of different materials. Said two members are constituted respectively by a wear member and by a fastener member for fastening the protection part to the ball-joint mechanism so as to be axially interposed between the journal and the connecting rod.

The wear member and the fastener member are juxtaposed at least axially, if not also radially, and they are secured to each other so as to make up the one-piece ring. The wear member and the fastener member are advantageously secured to each other in a workshop or at any rate prior to the protection part being installed on the ball-joint mechanism.

It should be considered that the term "secured" means that the fastener member and the wear member are firmly connected together independently of the protection part being installed on the mechanism.

The fastener member is a member for centering and axially positioning the protection part on the mechanism. The wear member is a sacrificial member that prevents direct lateral contact occurring between the facing flanks of one of the parts for protecting against the other. The wear member is made of a soft material suitable for being worn away so as to protect the mutually facing flanks respectively of the journal and of the connecting rod.

Selecting such an arrangement and assembly for the protection part procures the advantages of obtaining accurate positioning for the protection part on the mechanism, including regardless of the degree of progressive wear to which the protection part has been subjected. This also makes it easy to remove the protection part from the mechanism, to install it thereon, and to replace it once worn. This also makes it possible to limit the costs involved in obtaining, mounting, and maintaining the mechanism.

An approach of the present invention relates to installing the protection part freely on the mechanism between the facing flanks respectively of the connecting rod and of the journal. The concept of "freely" should be considered as being in contrast to the concept of "securely", whereby the protection part is fastened so as to be engaged against one and/or the other of the parts that are to be protected by being provided with specific attachment means. The protection part being installed freely on the mechanism should be considered as excluding any such attachment means.

The fastener member is rigid as a result of being made of a hard material, in particular a metal, and it includes axial positioning means and centering means. The fastener member leaves a space for receiving the wear member, which wear member is made of a soft material, a polymer material in particular.

The axial positioning means included in the fastener member are advantageously constituted by two opposite axial end faces of the fastener member. Said end faces co-operate respectively with opposite axial abutments that engage axially against the journal.

The axial end faces of the fastener member define between them the axial size of the fastener member, which size determines the overall axial size of the protection part, at least when considered in the volume defined between the two abutments. The axial size of the protection part between the opposite end faces of the fastener member should be determined in the radially defined zone between said abutments pressing axially against the journal. Determining the axial size in this way does not exclude possible axial overlapping of the wear member towards one and/or the other of the flanks of the part to be protected in a zone that is radially remote from the radial volume defined between the abutments.

The protection part is positioned and held radially and axially by means of the fastener member, which is blocked axially between the said abutments by the assembly pin. The assembly pin is provided with, or advantageously incorporates, axial clamping means that enable it to be caused to press axially against the journal. Axial clamping means are advantageously formed by the assembly pin which is arranged as a bolt or as an analogous clamping member. The assembly is in particular provided at its respective ends with opposing axial clamping heads.

The assembly pin is caused to engage axially against the journal in particular by the clamping means, via a shoulder on the assembly pin and the flank of the facing journal against the shoulder. The shoulder of the assembly pin is advantageously formed by an axial face of the spherical bearing surface member that it carries.

The shoulder of the assembly pin forms one of the abutments, the other abutment being formed by a flank of the journal. Engaging the abutments axially against the journal associates one of the abutments being formed by the shoulder of the assembly pin while the other abutment is formed by a flank of the journal against which the assembly pin is pressed axially by the clamping means.

The protection part, which is located axially between the shoulder and the flank of the journal, contributes by axial clamping to providing axial interfitting between the assembly pin and the journal, and more particularly by providing opposing axial interfitting of the abutments between each other.

The opposing abutments are advantageously arranged respectively by the flank of the journal to be protected and by a shoulder of the assembly pin carried by the journal. The journal, the assembly pin with the shoulder, and the protection part arranged freely between them by the fastener member together form a one-piece assembly as a result of being blocked axially in succession one against another by the clamping means.

The mechanism includes an easily interchangeable protection part from among a set of a small number of protection parts of specific sizes. Managing stocks of parts relating to the protection parts of such a set is thus made easier, both in terms of the fastener member and in terms of the wear member and/or in terms of the various protection parts that are made in a workshop.

On the basis of such a set of a small number of protection parts, a worn protection part can be replaced by a new protection part that may have different dimensional characteristics, in particular axially, without that affecting the general organization of the mechanism. Such a replacement is advantageous when replacing at least one of the spherical bearing surface members that make up the ball joint with a spherical bearing surface member that is analogous but of structure and/or dimensions that are different.

The axial spacing between the opposing abutments may vary when the ball joint is replaced, or when one of its component parts is replaced, such as the spherical bearing surfaces in relief and/or the assembly pin, more particularly. The organization of the ball-joint mechanism makes it possible to obviate such variation in the spacing between the opposing abutments by limiting the effects induced on making more complex the management of stocks of protection parts suitable for use and/or of the components making them up, and more particularly the fastener member and/or wear member.

The organization of the ball-joint mechanism provides a satisfactory compromise between managing a stock of protection parts and of component members therefor that is desired to have as small a number of parts as possible, and the facility made available for adapting the ball joint mechanism to a possible replacement of at least one of the parts constituting the ball joint by means of a part having the same function but a structure that is different, such as spherical bearing surface portions in relief, or indeed the assembly pin.

The axial pressing of the fastener member respectively against said shoulder and against the flank of the journal may take place directly or indirectly via spacers. Such spacers may be formed by a shoulder of a shouldered bushing for protecting the bore of the journal and/or by axial interposition elements arranged as washers or as analogous axial spacer elements.

The number of parts to be managed in stock in order to produce said set of protection parts is therefore further reduced. The fastener member may present the same axial extent for axial spacing dimensions between said abutments that may vary for a given mechanism. For a given mechanism, any variation in said spacing distance between the abutments may be occupied by a spacer selected from a set of spacers having specific axial extents.

The centering means of the fastener member are advantageously formed by the axial hole in the protection part for passing the assembly pin therethrough.

In a variant, the centering means are of the conc type for axial interfitting of the fastener member against the journal. By way of example, the centering means may be formed by a centering portion in relief having a conical bearing surface formed on the corresponding end face of the fastener member. Such a centering portion in relief co-operates with a conical bearing surface in relief of complementary shape included on the abutment formed on the journal. By analogy, the conical bearing surface in relief of complementary shape may be formed on an intermediate part that forms a spacer that is interposed axially between the abutment and the protection part.

Centering means of the interfitting conc type accommodate a difference of diameter between the assembly pin and the axial hole included in the protection part, and more particularly in the fastener member, without affecting the accurate positioning of the protection part. The protection part is suitable for co-operating with assembly pins of different diameters. For a given ball-joint mechanism, replacing the assembly pin with another assembly pin of different structure and/or diameter does not require the protection part to be replaced by a protection part having an axial hole of different diameter. The number of protection parts needed for said set is thus further reduced.

The structure of the protection part arranged as a one-piece ring is simplified as much as possible without affecting the looked-for qualities concerning positioning the protection part on the ball-joint mechanism and keeping it firmly in place thereon. The protection part is accurately positioned both radially and axially on the assembly pin passing therethrough via opposite axial end faces forming parts of the fastener member that is selected to be robust, in particular because it is made of a hard material.

The structure of the protection part makes it easy to adapt and also makes it easy to manage stocks of the members that make it up, while nevertheless allowing for structural variation of the part making up the ball joint in the event of replacement.

The protection part includes a wear member of significant volume so as to obtain a good lifetime for the protection part. The wear member occupies the space available between the opposite axial end faces of the fastener member. It is possible for the wear member to project axially into a zone that is radially apart from the radial size of the fastener member as measured between its end faces that co-operate with the abutments.

For a given fastener member, the volume of the protection part can easily be adapted depending on requirements as a function of the arrangement of the connecting rod and of the journal relative to each other. Managing respective stocks of a set of fastener members and a set of wear members prior to bonding them together in a workshop is thus facilitated.

In an advantageous embodiment, the fastener member includes a tubular cylinder having an axial bore that corresponds to the axial size of the protection part for passing the assembly pin therealong. The cylinder has a collar that forms the end face of the fastener member for pressing against the corresponding abutment formed by the flank of the journal that is to be protected.

The space for receiving the wear member is formed between the collar and the smaller-diameter end face of the cylinder. The end face of the cylinder is an end face of the fastener member that presses against the abutment of the assembly pin. The collar provides the other end face of the fastener member that presses against the abutment formed by the flank of the journal, or by analogy against an element forming a spacer function that is interposed between the collar and the flank of the journal.

Where appropriate, the collar is provided on its axial face that co-operates with the abutment of the journal with said centering portion in relief having a conical bearing surface that co-operates with the portion in relief of complementary shape included in said abutment, or by analogy against a said element having a spacer function.

The wear member is made in particular out of a polymer material and the fastener member is made out of a metal, with the wear member being secured thereto in a workshop inside the space provided for this purpose. The protection part includes means for securing the fastener member and the wear member together.

The securing means are advantageously means for adhesively bonding the wear member and the fastener member together, e.g. using cement, overmolding, or any other analogous bonding technique.

In a variant, the securing means may be of the type involving elastic interfitting between interfitting portions in relief forming parts respectively of the fastener member and of the wear member. Such elastic interfitting is obtained in particular by elastically deforming at least one interfitting portion in relief that is incorporated in the wear member. The elastically deformable nature of the interfitting portion in relief of the wear member is advantageously obtained as a result of the flexibility of the polymer material from which the wear member is made.

The elastically deformable interfitting portion in relief forming part of the wear member co-operates in particular with an interfitting portion in relief of complementary shape forming part of the fastener member. Elastic interfitting between the wear member and the fastener member is advantageously axial interfitting such that lateral impacts caused by the connecting rod against the protection part and absorbed by the wear member do not affect the securing of the fastener member and the wear member by the elastic interfitting.

More particularly, the said complementary interfitting portion in relief is advantageously formed on the face of the collar that is axially remote from the face co-operating with the abutment of the journal.

Securing the fastener member to the wear member by elastic interfitting based on elastic deformation of the wear member enables the fastener member to be made of a material that is hard and suitable for pressing in opposite directions against the abutments.

After a protection part has been subjected to wear, having the fastener member secured to the wear member by elastic interfitting enables the fastener member to be retained whether worn-out wear member is replaced by a new wear member, without that leading to any damage to the fastener member. Such a new wear member may be selected from a set of wear members of respective different sizes depending on requirements relating to the particular arrangement of the connecting rod and the journal making up any mechanism to which the present invention applies.

For a given fastener member and/or for a given mechanism, the said new wear member may be selected from a set of wear members having specific dimensional characteristics. For example, the wear members of the set may be of specific axial extents so as to match the axial size of the wear member as a function of possible replacement of at least one of the spherical bearing surface members with another spherical bearing surface member of different structure and/or dimensional characteristics.

In a general approach of the present invention, the proposed ball-joint mechanism is a ball-joint mechanism between a connecting rod and at least one journal. The journal may equally well be a single journal or a journal in the form of a two journal clevis on which the connecting rod is mounted. The mechanism allows the connecting rod and the journal to move relative to each other both in pivoting and with lateral clearance, by means of a ball joint that is interposed between them.

The mechanism includes an assembly pin that engages at least axially if not also radially against the journal. The assembly pin is provided with a spherical bearing surface in relief co-operating with a bearing surface in relief of complementary shape forming part of the connecting rod. The bearing surface in relief may in particular be fitted onto the assembly pin or may indeed be incorporated in the assembly pin.

The mechanism includes axial clamping means engaged against the journal and against the assembly pin in order to cause them to press axially against each other. The axial clamping means are preferably incorporated in the assembly pin, which is advantageously arranged as a bolt or an analogous clamping member. In another variant, the axial clamping means are formed by a fitted axial clamping member that presses in opposite directions respectively against the journal and the assembly pin.

The mechanism includes at least one lateral protection part that is arranged as a one-piece ring. The protection part is axially interposed between the facing flanks of the connecting rod and of the journal, and it protects them against coming laterally into contact against each other. The protection part incorporates a wear member and a fastener member that are made of respective materials. The wear member and the fastener member are assembled together by securing means.

The fastener member includes axial positioning means and centering means relative to the journal. The axial positioning means include two opposite thrust faces of the fastener member that press axially respectively against opposing abutments engaged on the journal.

In the present invention, the protection part is in the shape of a one-piece ring incorporating a fastener member that is rigid as a result of being made of a hard material, in particular a metal. A wear member made of a soft material, in particular a polymer material, is fitted on the fastener member by said securing means.

The protection part is mounted freely on the mechanism, being blocked axially between said abutments by the clamping means. Said thrust faces of the fastener member are formed respectively by two axial end faces of the fastener member that press respectively against two said opposite abutments. Said abutments are arranged respectively on either side of the protection part. Said thrust faces of the fastener member leave between them a space for receiving the wear member.

More particularly, the fastener member includes a tubular cylinder provided with a collar arranged axially opposite from an end face of the cylinder. The collar forms a said thrust face of the fastener member that presses against the journal. The end face forms the other said thrust face that presses against a shoulder of the assembly pin. Said shoulder is formed in particular by the spherical bearing surface in relief of the assembly member.

An axial bore of the tubular cylinder advantageously forms axial clearance for passing the assembly pin through the protection part.

In an embodiment, said centering means are formed by the axial hole co-operating with a peripheral surface of the assembly pin.

In a variant embodiment, the centering means are of the type constituted by an axial interfitting conc enabling the fastener member to engage axially against the journal. A centering conical bearing surface in relief is formed at either one of the end faces of the fastener member and co-operates by sliding interfitting with a conical bearing surface in relief of complementary shape included in the corresponding abutment.

Said space is advantageously arranged around the peripheral wall of the cylinder in the axial gap defined between the collar and the end face of the cylinder.

The axial extent of the fastener member corresponds in particular to the axial extent of the protection part at least when considered in the volume defined between said two abutments if not in its overall volume.

More particularly, the wear member is equally well received inside the space or it projects outside from the space towards at least any one of the facing flanks of the connecting rod and of the journal.

In an embodiment, the securing means are of the adhesive bonding type between the wear member and the fastener member. By way of example, such adhesive bonding may make use of cement, of overmolding, or indeed of bonding in which the bonding material is the result specifically of melting the wear member. Other analogous bonding techniques may be used.

In another embodiment, that may be taken on its own or in combination with securing of the adhesive bonding type, the securing means may be of the elastic interfitting type. By way of example, such securing means may comprise interfitting portions in relief of complementary shapes that are formed respectively on the fastener member and incorporated in the wear member. The interfitting portions in relief incorporated in the wear member are elastically deformable, in particular as a result of the flexibility of the material from which the wear member is made.

In an embodiment, the interfitting portions in relief are arranged axially, one on the face of the collar opposite from the bearing surface whereby the collar presses against the abutment that is associated therewith. The other interfitting portion in relief is arranged on the face of the wear member that faces said opposite face of the collar. By way of example, such interfitting portions in relief may be arranged in the form of at least one stud or analogous interlocking member that projects from the wear member, the stud co-operating with a housing of complementary shape included in the collar.

At least the stud and the housing that receives it may be formed equally well either on the wear member or on the fastener member. The interfitting portion in relief provided on the wear member is flexible since it is advantageously made of the elastically deformable material constituting the wear member. The interfitting portion in relief formed on the wear member deforms under the effect of stress exerted thereon by the other interfitting portion in relief forming part of the fastener member and that is made of the hard material constituting the fastener member.

BRIEF DESCRIPTION OF THE SEVERAL
VIEWS OF THE DRAWINGS

An embodiment of the present invention is described below with reference to the figures of the accompanying sheet, in which.

DETAILED DESCRIPTION OF THE INVENTION

Figures 1, 2, 3:
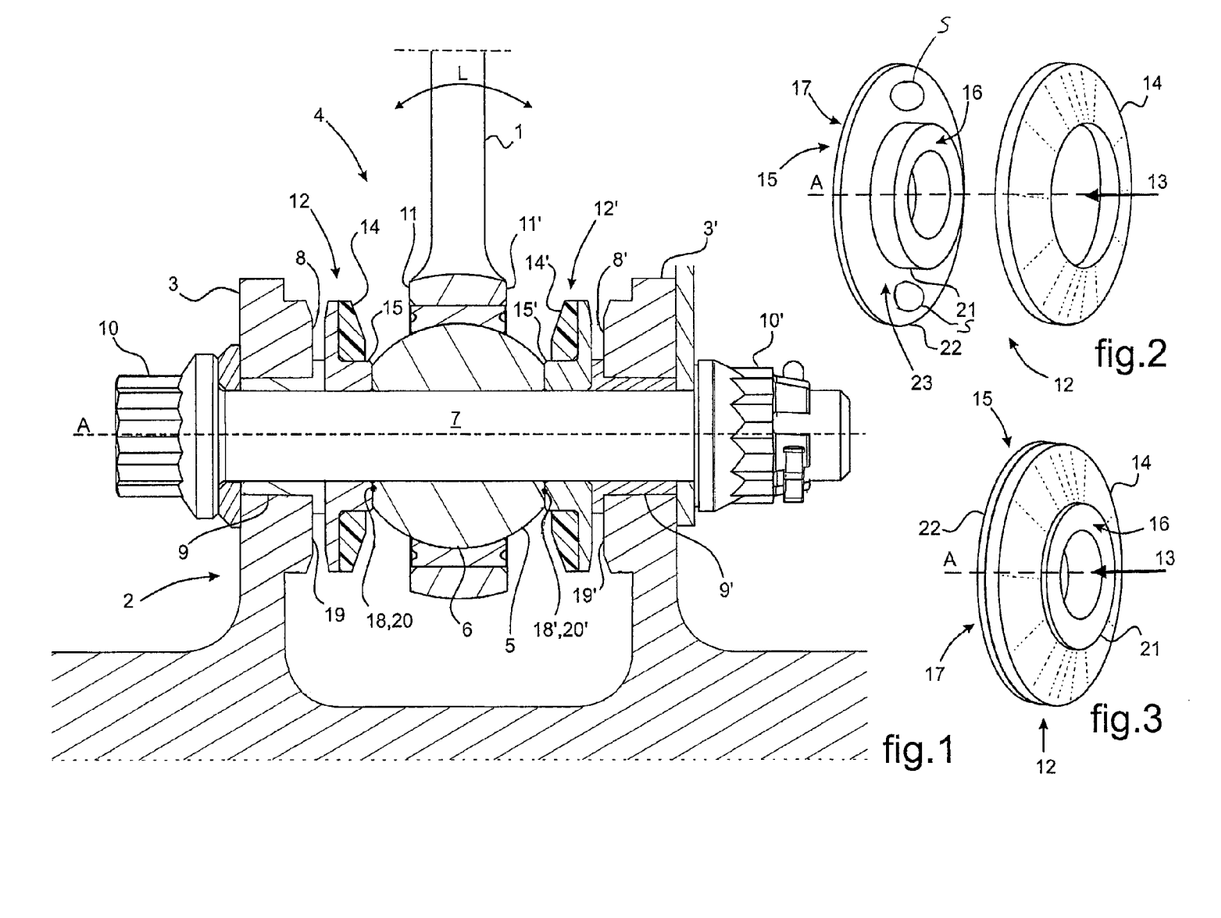
FIG. 1 is an axial section view of a ball-joint mechanism between a connecting rod and a clevis, in a preferred embodiment of the present invention.
FIGS. 2 and 3 are perspective views of a side protection piece between the connecting rod and the journals forming the clevis of the ball-joint mechanism shown in FIG. 1, respectively in an exploded view and in an assembled view.

In FIG. 1, a connecting rod 1 is carried by a clevis 2 having two journals 3 and 3' by means of a ball joint 4. Co-operating portions in relief 5 and 6 having spherical bearing surfaces are formed respectively on the connecting rod 1 and on an assembly pin 7 that is axially engaged in the journals 3, 3' of the clevis.

In the embodiment shown, the portion in relief 6 of the spherical bearing surface included in the connecting rod 1 is arranged as a cage. The cage receives the male spherical bearing surface in relief 5 that is arranged as a ball joint and that is carried by the assembly pin 7. The ball joint arranged between the connecting rod 1 and the assembly pin 7 allows the connecting rod 1 to move sideways towards the flanks 8, 8' of the journals 3, 3'.

Such a ball-joint mechanism is used in particular for forming a flight control member of a rotorcraft to enable a pilot to vary the pitch of the blades of a rotary wing forming part of a rotor of the rotorcraft.

The assembly pin 7 is carried by the journals 3, 3' at its respective ends. Bushings 9, 9' are interposed between the assembly pin 7 and the bores of the journals 3, 3' through which the assembly pin 7 extends. The assembly pin 7 incorporates axial clamping means 10, 10', being arranged as a bolt or an analogous clamping member.

At its respective ends, the assembly pin 7 is provided with clamping heads that form the clamping means 10, 10'. The clamping heads 10, 10' press axially in opposite directions against respective ones of the journals 3, 3', and more particularly against the faces of the journals 3, 3' that are remote from their flanks 8, 8' that face the corresponding flanks 11, 11' of the connecting rod 1. Axially clamping the assembly pin 7 against the journals 3, 3' causes the assembly pin 7 to engage axially against the journals 3, 3'.

The freedom of the connecting rod 1 to move sideways with lateral clearance L as made possible by the ball joint leads to a risk of the flanks 11, 11' of the connecting rod 1 striking against the respective flanks 8, 8' facing the journals 3, 3'. In order to preserve the flanks 11, 11' and 8, 8' of the connecting rod 1 and of the journals 3, 3', protection parts 12, 12' are interposed axially between them. One said protection part 12 is shown in isolation in FIGS. 2 and 3.

The protection parts 12 and 12' are arranged as respective one-piece rings, each having a circular peripheral wall and axially opposite end faces 16 and 17. Each protection part 12, 12' has an axial hole 13 to enable the assembly pin 7 to be passed through them. Each part 12, 12' is made up of a wear member 14, 14' and a fastener member 15, 15' that are secured to each other by securing means S (e.g., adhesive bonding), shown schematically in FIG. 2.

The wear member 14, 14' acts as a sacrificial piece and it is made of a soft material, a polymer material or other analogous soft material suitable for performing the function of a sacrificial piece. The wear member 14, 14' is placed on the path of the lateral clearance L of the connecting rod 1 in order to protect the facing flanks 11, 11' and 8, 8' of the connecting rod 1 and of the corresponding journal 3, 3'.

The fastener member 15, 15' is made of a hard material, and it performs a function of positioning and holding the wear member 14, 14' on the ball-joint mechanism. The axial end faces 16, 17 of the fastener member 15, 15' define the axial extent of the protection part 12, 12' and between them they leave space 23 for receiving the wear member 14, 14'.

The axial end faces 16, 17 of the fastener member 15, 15' are placed to press axially in opposite directions against abutments 18, 18' and 19, 19' that are axially engaged against the assembly pin 7 and against the corresponding journals 3, 3'. One of the abutments 18, 18' is formed by a shoulder 20, 20' on the assembly pin 7, and the other abutment 19, 19' is formed by the flank 8, 8' of the journal 3, 3' that is to be protected, possibly via a shoulder forming part of each bushing 9, 9'. The shoulder 20, 20' is constituted in particular by the spherical bearing surface in relief 5 that is provided on the assembly pin 7.

The protection part 12, 12' is mounted freely on the mechanism, having the assembly pin 7 passing through it via the axial hole 13 it includes. Axial clamping provided by the clamping means 10, 10' provides axial blocking in succession from the respective ends of the assembly pin 7 between the assembly pin 7, the journals 3, 3', the protection parts 12, 12', and the spherical bearing surface in relief 5 carried by the assembly pin 7. The robustness of the fastener 15, 15' procured by being made out of a hard material makes such axial blocking possible without affecting the desired quality of the wear member 14, 14' for protecting the facing flanks 11, 11' and 8, 8' of the connecting rod 1 and of the journals 3, 3'.

The fastener member 15, 15' is shaped as a tubular cylinder 21 having a collar 22 at one of its ends. The collar 22 serves to enable the protection part 12, 12' to press axially against the flank 8, 8' of the corresponding journal 3, 3'. The end face 16 of the fastener member 15, 15' that is axially remote from the collar 22 serves to enable the protection part 12, 12' to press axially against the corresponding abutments 18, 18'.

Said end face 16 emerges beyond the wear member 14, 14' so as to prevent any random axial thrust of the protection part 12, 12' against the corresponding abutment 18, 18'. Nevertheless, it is possible to envisage allowing the wear member 14, 14' to project axially towards the connecting rod in a gap of radially small size outside the volume defined between the opposing abutments 18, 18' and 19, 19' against which the fastener member 15, 15' presses.

The protection part 12, 12' is centered on the assembly pin 7 via the axial hole 13 therethrough. The axial bore in the tubular cylinder 21 forms the axial hole 13 in the protection part 12, 12'.

What is claimed is:

1. A ball-joint mechanism between a connecting rod and a journal, the mechanism allowing the connecting rod and the journal to move relative to each other both in pivoting and in lateral clearance by means of a ball joint interposed between the connecting rod and the journal;

the mechanism including an assembly pin engaged axially and radially against the journal, the assembly pin being provided with a spherical bearing surface in relief co-operating with a bearing surface in relief of complementary shape forming part of the connecting rod;

the mechanism including axial clamping means engaged against the journal and against the assembly pin to press the journal and the assembly pin axially against each other;

the mechanism including a lateral protection part that is shaped as a ring and that is interposed axially between facing flanks of the connecting rod and of the journal, protecting the connecting rod and the journal from lateral contact against one another;

the protection part incorporating a wear member and a fastener member that are made of respective materials and that are assembled together by securing means; and the fastener member including axial positioning means and centering means relative to the journal, the axial positioning means including two opposite thrust faces of the fastener member that press axially respectively against an abutment on the journal and an abutment on the assembly pin;

wherein:

the fastener member is rigid and made of a hard material, and the wear member is made of a soft material and is fitted on the fastener member;

the protection part is freely mountable on the assembly pin, being axially blocked between the abutments by the clamping means;

the thrust faces of the fastener member are formed respectively by two axial end faces of the fastener member, the end faces pressing respectively against two opposite ones of the abutments arranged respectively on either side of the protection part; and the wear member is at least partially received in a space located between the thrust faces.

2. The ball-joint mechanism according to claim 1, wherein the fastener member includes a tubular cylinder provided with a collar arranged axially opposite from an end face of the cylinder, the collar forming one said thrust face of the fastener member for pressing against the journal, the end face forming the other said thrust face for pressing against a shoulder of the assembly pin.

3. The ball joint mechanism according to claim 2, wherein an axial bore of the tubular cylinder forms an axial clearance for passing the assembly pin through the protection part, said centering means being formed by the axial hole co-operating with a peripheral surface of the assembly pin.

4. The ball-joint mechanism according to claim 2, wherein the centering means is of an axial interfitting cone type enabling the fastener member to press axially against the journal, a centering conical bearing surface in relief being is formed in either one of the end faces of the fastener member and configured to cooperate by sliding interfitting with a conical bearing surface in relief of complementary shape included in a corresponding abutment.

5. The ball-joint mechanism according to claim 2, wherein said space is arranged around a peripheral wall of the tubular cylinder in an axial gap defined between the collar and the end face of the cylinder.

6. The ball-joint mechanism according to claim 1, wherein an axial extent of the fastener member corresponds to an axial extent of the protection part at least when considered in a volume defined between the two said abutments.

7. The ball joint mechanism according to claim 1, wherein the wear member is received inside the space.

8. The ball joint mechanism according to claim 1, wherein the securing means is of the adhesive bonding type between the wear member and the fastener member.

9. The ball-joint mechanism according to claim 1, wherein the securing means is of the elastic interfitting type comprising interfitting portions in relief of complementary shapes that are respectively formed on the fastener member and incorporated in the wear member, the interfitting portions in relief incorporated in the wear member being elastically deformable.

10. The ball joint mechanism according to claim 9, wherein the interfitting portions in relief are arranged axially respectively on a face of a collar opposite from the bearing surface whereby the collar presses against the abutment associated therewith, and on the face of the wear member facing said opposite face of the collar.

11. The ball joint mechanism according to claim 1 wherein the wear member projects outside from the space towards at least any one of the facing flanks of the connecting rod and of the journal.

12. A ball joint arrangement comprising:
a connecting rod;
a journal; and
a ball joint mechanism positioned between the connecting rod and the journal for allowing the connecting rod and the journal to pivot relative to each other and move laterally relative to each other, the ball joint mechanism including:
an assembly pin supported axially and radially by the journal, the assembly pin including a spherical bearing surface that is configured to co-operate with a bearing surface of complementary shape forming part of the connecting rod;
axial clamping means configured to press the journal and the assembly pin axially against each other; and
a lateral protection part that is shaped as a ring and that is interposed axially between facing flanks of the connecting rod and the journal for protecting the connecting rod and the journal from lateral contact with one another, the protection part including a wear member and a fastener member that are connected together by securing means, the fastener member including axial positioning means and centering means relative to the journal, the axial positioning means including two opposite thrust faces of the fastener member that press axially respectively against an abutment on the journal and an abutment on the assembly pin, wherein:
the fastener member is rigid and made of a first material, and the wear member is made of a second material that is softer than the first material;
the protection part is mounted on the assembly pin and is axially blocked between the abutments by the clamping means;
the thrust faces of the fastener member are formed respectively by two axial end faces of the fastener member, the end faces pressing respectively against the abutments arranged respectively on either side of the protection part; and
the wear member is at least partially received in a space located between the thrust faces.

13. A ball joint mechanism for positioning between a connecting rod and a journal and configured to allow the connecting rod and the journal to pivot relative to each other and move laterally relative to each other, the ball-joint mechanism comprising:
an assembly pin configured to be supported axially and radially by the journal, the assembly pin including a spherical bearing surface that is configured to co-operate with a bearing surface of complementary shape forming part of the connecting rod;
axial clamping means configured to press the journal and the assembly pin axially against each other; and
a lateral protection part that is shaped as a ring and positionable axially between facing flanks of the connecting rod and the journal for protecting the connecting rod and the journal from lateral contact with one another, the protection part including a wear member and a fastener member that are configured to be connected together by securing means, the fastener member including axial positioning means and centering means, the axial positioning means including two opposite thrust faces of the fastener member that are configured to press axially respectively against an abutment on the journal and an abutment on the assembly pin, wherein:

the fastener member is rigid and made of a first material, and the wear member is made of a second material that is softer than the first material;

the protection part is mountable on the assembly pin and is axially blockable between the abutments by the clamping means;

the thrust faces of the fastener member are formed respectively by two axial end faces of the fastener member, the end faces being configured to press respectively against the abutments arrangeable respectively on either side of the protection part; and at least a portion of the wear member is positionable between the thrust faces of the fastener member.

14. The ball-joint mechanism according to claim 13 wherein the fastener member includes a tubular cylinder provided with a collar arranged axially opposite an end face of the cylinder, the collar forming one of the thrust faces of the fastener member for pressing against the journal, the end face forming the other thrust face for pressing against a shoulder of the assembly pin.

15. The ball joint mechanism according to claim 14 wherein an axial bore of the tubular cylinder forms an axial clearance for passing the assembly pin through the protection part, the centering means being formed by the axial hole co-operating with a peripheral surface of the assembly pin.

16. The ball joint mechanism according to claim 14 wherein the centering means is of an axial interfitting conc type enabling the fastener member to press axially against the journal, a centering conical bearing surface being formed at either one of the end faces of the fastener member and configured to cooperate by sliding interfitting with a conical bearing surface of complementary shape included in a corresponding abutment.

17. The ball-joint mechanism according to claim 14 wherein the wear member is positionable around a peripheral wall of the tubular cylinder in an axial gap defined between the collar and the end face of the cylinder.

18. The ball-joint mechanism according to claim 13 wherein the securing means is of the adhesive bonding type.

19. The ball joint mechanism according to claim 13 wherein the securing means is of the elastic interfitting type comprising interfitting portions of complementary shapes that are respectively formed on the fastener member and incorporated in the wear member, the interfitting portions incorporated in the wear member being elastically deformable.

20. The ball-joint mechanism according to claim 13 wherein the wear member is configured to project axially toward at least one of the facing flanks.

* * * * *